219-121.
10-30-73 XR 3,768,157

United States Patent [19]

Buie

[11] 3,768,157

[45] Oct. 30, 1973

[54] PROCESS OF MANUFACTURE OF SEMICONDUCTOR PRODUCT

[75] Inventor: James L. Buie, Panorama City, Calif.

[73] Assignee: TRW Inc., Redondo Beach, Calif.

[22] Filed: Mar. 31, 1971

[21] Appl. No.: 130,009

Related U.S. Application Data

[60] Continuation of Ser. No. 788,719, Jan. 3, 1969, abandoned, which is a division of Ser. No. 638,361, May 15, 1967, abandoned.

[52] U.S. Cl. ........................ 29/613, 29/588, 29/620, 219/121 LM

[51] Int. Cl. ........................ H01c 1/02, H01c 17/00

[58] Field of Search ...................... 29/572, 574, 588, 29/613, 620, 627, 610, 121 LM; 117/211; 264/272; 338/226, 235; 219/121 L

[56] References Cited

UNITED STATES PATENTS

| | | | |
|---|---|---|---|
| 3,217,088 | 11/1965 | Steierman | 219/121 LM |
| 3,340,602 | 9/1967 | Hontz | 29/588 |
| 3,388,461 | 6/1968 | Lins | 29/620 X |
| 3,497,947 | 3/1970 | Ardezzone | 29/589 X |
| 3,534,472 | 10/1970 | DeJong et al. | 29/620 |
| 3,535,778 | 10/1970 | Falanga et al. | 219/121 L UX |
| 2,103,040 | 12/1937 | Radcliffe | 29/610 X |
| 3,080,481 | 3/1963 | Robinson | 29/584 X |
| 3,383,454 | 5/1968 | Dix | 29/628 X |

OTHER PUBLICATIONS

Osial, T. A., "Industrial Laser Applications," Instruments and Control Systems, Oct., 1967, pages 101–104.

EEE, November, 1963, p. 18, Article Entitled "Laser Trims Resistors to 0.05 Percent."

*Primary Examiner*—J. Spencer Overholser
*Assistant Examiner*—Ronald J. Shore
*Attorney*—Daniel T. Anderson

[57] ABSTRACT

This invention relates to a process of resistor adjustment and to a semiconductor microelectronic device package, wherein a window cap or other optically transparent access means is provided in a flat pack or similar structure for such purposes as the post fabrication adjustment of microcircuit resistors by light from a source such as a laser. By providing an optically transparent cover for an integrated or thin film circuit package, post fabrication adjustment of elements such as thin film resistors by intense optical radiation is possible. The cap or window, which may be any optically transparent means suitable to the particular structure, permits a seal to be made immediately after completion of fabrication of the circuitry so as to preclude contamination by moisture or dirt. Thereafter, resistance values are adjusted by means of a focused laser beam and, if desired, an opaque paint may then be applied to the window cap to exclude radiation which might lead to spurious photo-electric effects.

10 Claims, 8 Drawing Figures

INVENTOR.
James L. Buie
BY
Donald C Keaveney
ATTORNEY

PROCESS OF MANUFACTURE OF SEMICONDUCTOR PRODUCT

CROSS-REFERENCES TO RELATED APPLICATIONS

This application is a streamlined continuation of application Ser. No. 788,719, filed Jan. 3, 1969, which in turn is a division of application Ser. No. 638,361, filed May 15, 1967, now abandoned.

BACKGROUND OF THE INVENTION

As has been noted on pages 297 to 301 of the book "Microelectronics" by Edward Keonjian (McGraw Hill 1963), the techniques employed to assemble and package microcircuits have an important bearing on their usability and reliability. This is particularly true of planar semiconductor integrated circuits where the residual failure modes are generally found to be mechanical. In FIG. 5–23 on page 298 of this book, there is shown a state-of-the-art form of "flat package" which is described on pages 299–301, wherein its advantages such as packing density, etc., and its problem are set forth. In particular, on page 300 it is noted that the sealing of this otherwise desirable package presents a formidable problem. The author points out that both metal and ceramic covers have been used and concludes that ceramic appears to him to be the best all around solution.

Such packaging as this is increasingly needed for integrated and thin film microelectronic circuits fabricated in or on semiconductor wafers or chips. One of the manufacturing techniques used for this type of circuit is the deposition of thin film resistors of material commonly referred to as cermet on the chip. After the deposition completing a circuit, it is often necessary to make a final adjustment of resistance values in order to afford precisely the mode of operation desired.

It has previously been demonstrated that this adjustment can be performed by focusing a laser beam on the resistor whose value is to be adjusted. Reference is made, for example, to the issue of "Electronic Design" dated Nov. 8, 1966, wherein on page 40 an article entitled, "Ruby Laser Process Controls Resistivity" will be found. Reference may also be made to an article entitled, "Laser Outlook" on page 64 of "Electronic News" for Monday, Feb. 27, 1967 which, sets forth under the subheading, "Communications," that one of the applications for the laser has been shown to be changing the properties of thin film resistors.

In the prior art, however, it has been the practice to manufacture the microelectronic device and then to perform the laser resistivity adjustment in open atmosphere prior to encapsulating or packaging the device by an opaque material such as the metal or ceramic flat pack cover.

This has the disadvantage that during the handling of the microelectronic circuit to perform the laser adjustment, the circuit is exposed to moisture and dirt from the atmosphere which may permanently and adversely affect its properties. Also, once encapsulated in an opaque material, the circuit cannot later be examined without destruction of the package. Further, of course, no access to the circuit for signal tracing or other purposes is possible when opaque encapsulation is used.

SUMMARY OF THE INVENTION

In accordance with the present invention, an optically transparent cover or window cap is provided for an integrated circuit package immediately after completion of the manufacture and mounting of the circuit therein. Adjustment of the thin film resistors of the circuit or other desired components thereof by intense optical radiation from a laser or other radiation source may then be made through the transparent window cap. The adjusted resistance values then cannot thereafter be affected by ambient atmosphere. If the circuit is one which will be exposed to undesired radiation in its intended use, an opaque layer of paint, ink, or the like, may finally be provided over the glass.

The circuit is thus protected by a hermetic seal immediately after fabrication so as to preclude adverse effects of moisture or dirt. On the other hand, optical inspection of the completed unit is still possible either before or after the laser adjustment of resistance values. Should there be a circuit failure or change of circuit characteristics after use, optical inspection is still possible by removing the paint from the glass cover. This may reveal the cause of the failure. Furthermore, if the cover is made of material transparent to infra red, operating circuits may be inspected for temperature distribution by suitable equipment. The window capped circuit also permits simulation of the radiation response of the completed circuit by using appropriate high intensity optical sources. Mechanically, a sturdy package is provided. Finally, for electro-optical uses or for integrated circuit analysis, a focused light source can act as an emitter and allow optical signal input, signal tracing or the like on the completed circuit package.

These and other advantages and objects of the invention will be more apparent from the detailed description below taken in connection with the accompanying drawings.

Figure 1:
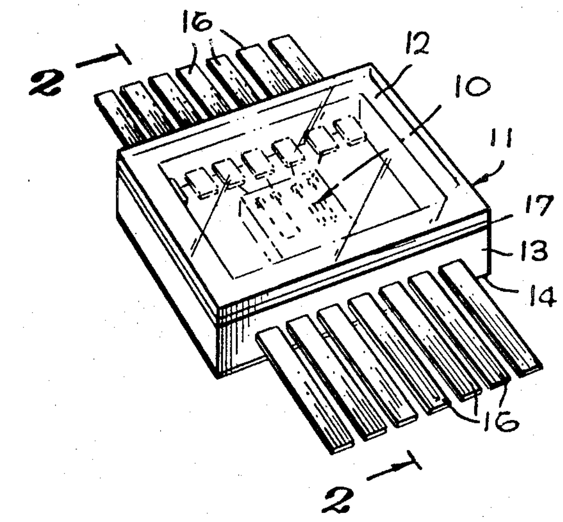
FIG. 1 is an isometric view of a completed microcircuit package in accordance with the present invention.

FIGS. *4a*, *4b*, *4c*, and *4d* are a series of semi-schematic sectional views illustrating the steps in fabrication of the package of FIG. 1.

Figure 5:
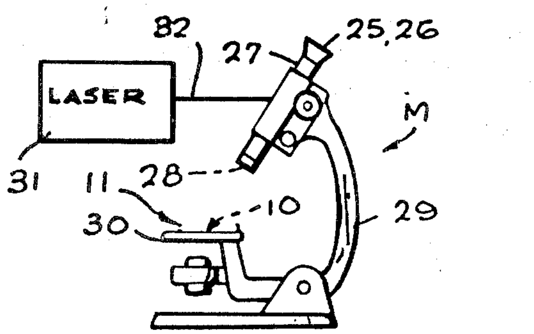

FIG. 5 is a schematic view illustrating the process whereby resistor values may be adjusted.

DESCRIPTION OF THE PREFERRED EMBODIMENT

Figure 2:
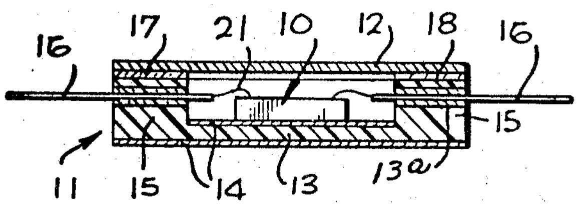
FIG. 2 is a sectional view taken on the line 2—2 of FIG. 1.

Turning now to the drawing and particularly to FIGS. 1 and 2 thereof, there is shown a semiconductor device 10 in a package 11 which has been provided with a transparent cover 12. The transparent cover 12 may preferably be a cover glass slide having a thickness in the range of 7 to 20 mils.

The package otherwise may, for example, be fabricated from a standard 1/4 inch × 3/8 inch — 14 lead "Kovar" flat pack of the type currently available commercially. Such a package comprises a "Kovar" base member 13 which normally has thin films of gold plating 14 on both surfaces and which is provided with a peripheral upstanding lid frame 15 on all four sides thereof. A plurality of gold plated electrical contact members 16 are sealed into and project through the side members of the lid frame. Contact members 16 are sealed in insulating sealing glass members 13*a*. A commonly available commercial variety includes 14 such leads or contact fingers.

Any desired element such as a silicon semiconductor chip 10 having microcircuitry therein or thereon may be encased in such a package. Typically, the lid frame projects a sufficient distance above the gold plating 14 on the inside of the base member so that a flat cover may be attached to the lid frame and still afford slight clearance for the element encased in the package. In the prior art, such lids were commonly formed of ceramic or metal members so that they could be conveniently hermetically sealed to the lid frame by resistance welding or other suitable means.

It is the teaching of the present invention that glass having a matching coefficient of thermal expansion with package parts to which it is attached or other similar transparent member affords not only advantages of mechanical strength and ease of fabrication in the package but also permit uses for the device which have not heretofore been possible. Such uses, for example, include the post fabrication adjustment of thin film resistors by a laser beam, the optical inspection of the circuit for any other purpose, the injection of light signals for operation or for signal tracing or any other desired purposes.

In the package shown in FIGS. 1 and 2 the transparent cover 12 is sealed hermetically to the "Kovar" lid frame 15 by a layer 17 of Corning seal glass which is a "Pyroceram" cement. It will of course be understood, however, that any and all of the materials specified may vary. The package body need not be formed of "Kovar", the transparent member and other materials specified may vary. The transparent cover may, for example, be different types of glass, plastic, or other optically transparent materials, and many different sealants or means of attachment may be readily found.

With respect to one particular exemplary package, however, the following detailed fabrication information has been found to provide a desirable device. The package body having a base 13 and peripheral lid frame 15 was of "Kovar-A." "Kovar-A" is a registered trade name of an alloy specified by the manufacturer to consist of Nickel 29%; Cobalt 17%; Iron (remainder) with maximum amounts of Manganese 0.50%; Silicon 0.20%; Carbon 0.06%; Aluminum 0.10%; Magnesium 0.10%; Zirconium 0.10%; and Titanium 0.10%; but the total amount of the last four elements combined not exceeding 0.20%. Over a temperature range of about 40° to 300° C, the thermal expansion of this material is linear and ranges in absolute amount from 0 at 40° C to about 1.5 mils per inch at 300° C. Normally, these packages are sold with a thin layer of gold on all horizontal surfaces, including the top of the lid frame 15.

Figure 4A:
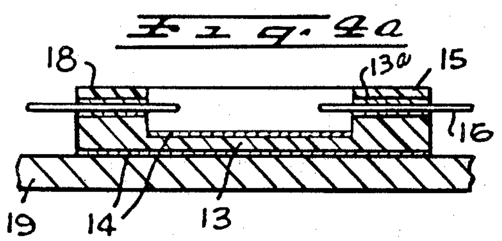

As is illustrated in FIG. 4*a*, the first step in the fabrication of the package was to remove the gold plating from the top surface 18 of the lid frame 15 by sanding or other suitable abrasive means. The package was then cleaned and placed on the hot plate 19 in air to oxidize the top surface 18. This oxidation was carried out at a temperature of 500° C for 5 minutes.

Figure 4B:
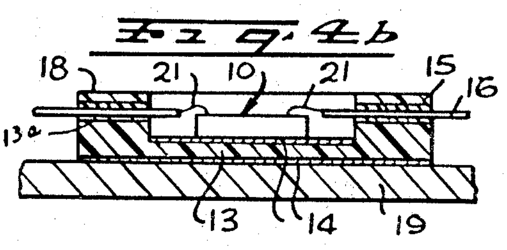

Next, as shown in FIG. 4*b*, the semiconductor device 10 was attached to the base 13 of the package. This may readily be accomplished by placing the silicon chip 10 on the gold plating 14 of the upper surface of the base member 13 with the active surface of the chip 10, or the surface containing the circuitry, facing up, and heating so that the silicon forms a eutectic with the gold or is gold soldered to mechanically attach element 10 to the base 13. Electrical contact to the base may or may not be made as desired depending upon the particular silicon device being used. In the present case, only a mechanical attachment was made since the substrate of the silicon chip served as an insulator. Once the chip 10 was mounted, gold wire was used to connect desired ones of the fingers 16 to contact points on the chip by techniques well known in the art which are, for example, described in the above noted book by Keonjian.

Figure 4C:
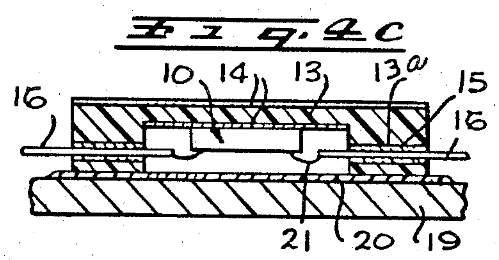

As may be seen in FIG. 4*c*, a layer 20 of sealant which may be Corning seal glass is melted on the upper surface of the hot plate 19. The package is then inverted, taking care that the semiconductor chip 10 is firmly attached and is not touched, and the upper surfaces 18 of the lid frame are then placed in the layer 20 of seal glass so as to completely wet the upper surface of the lid frame. This step is preferably carried out at approximately 450° C on the hot plate.

Figure 4D:
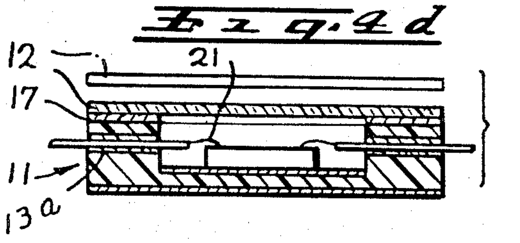

As may be seen in FIG. 4*d*, this leaves the layer 17 of seal glass on upper surface 18 of the lid frame 15 when it is removed from the hot plate and again placed in an upright position. The cover glass 12 may then simply be placed on the lid frame being dropped in place with a pair of tweezers, for example, and will seal itself. If desired, after placing the Corning thin cover glass slide on the frame, the glass may be wet for approximately 3 minutes at temperatures noted above for the seal glass. When a sample package fabricated as described herein is broken, it will be noted that the cover glass side is very strong, in fact, that it is stronger than the rest of the package since the bottom of the package has been observed to break first. It has also been noted that the Corning seal glass sticks very well to the oxidized "Kovar" frame, but that this is not so if the gold plating is left on the frame. Furthermore, the seal is found to be very good. On test samples, cycling has been conducted between boiling water and liquid nitrogen. After a plurality of cycles, the cover was still found to be intact and no evidence of water bubbles was observed.

In commercial production practice, it will, of course, be understood that various modifications in the sequence of steps involved in fabricating the package may readily be made. For example, the package frame could initially be oxidized and provided with a glass seal or frit on the upper edges 18 of the lid member before the circuitry is inserted in the package. There would then remain only the positioning of the cover and any suitable heat treating to form the seal immediately after the semiconductor chip is attached to the base and electrical connections made. Furthermore, it will also be understood that the drawings illustrate only a single semiconductor chip which had a resistor test pattern fabricated thereon for purposes to be described below. In practice, of course, a more complete utilization of the package mounting area might be indicated.

Once the device has been fabricated and sealed by the steps illustrated in FIG. 4, the package will have the form shown in FIGS. 1 and 2 and is then ready for further processing as for adjustment of resistor values by focusing the laser beam through the window. In order to verify this process, a device of the type shown in FIGS. 1 and 2 was fabricated wherein the silicon chip 10 simply had deposited thereon a plurality of thin film resistors 22, 23, and 24 as may be seen in greater detail in FIG. 3. The completed device is then ready for processing by a laser beam to adjust resistance values in accordance with techniques which per se are known to the prior art. The difference in the present invention, of course, is that the laser beam is applied through the transparent window and that the circuitry is thus not exposed to ambient moisture or dirt during the adjustment process.

One apparatus which is suitable for this final adjustment step is shown in FIG. 5 wherein there is schematically indicated a microscope M, having a pair of eyepieces 25 and 26 which are mounted on the viewing end of a microscope tube 27, having an objective lens 28. The microscope frame 29 supports a table 30 on which the sealed package 11 is adjustably positioned. A laser 31 is indicated in block form and is shown as supplying light energy through any convenient optical path 32 leading into the microscope system for optical focusing on the package 11 through its transparent cap 12. The microscope arrangement is such that one first views the circuitry through reticle crosshairs and thus positions it to determine where the focused light beam from the laser will fall.

The details of this apparatus are not shown or described herein, since such devices are commercially available. One such suitable device, for example, is made by T.R.G., Control Data Corporation, Electro-Optical Products Section, Route 110, Melville, L.I., New York. The apparatus is identified by the manufacturer as the T.R.G. "604" Microwelder. This model is described by the manufacturer as a laser-based system designed with the primary aim of providing a practical laser microwelding work station. The welding head consists of a specially designed laser and optics and can be pulsed once every 5 seconds and delivers sufficient energy to accomplish most welding requirements encountered in the semiconductor and microcircuit industry. Accessories provide various pulse widths to afford proper energy application. Peak available power can go to 10 megawatts with a pulse duration of 30 to 40 nanoseconds. In the actual apparatus an operator seated at the work table exercises complete control by means of hand and foot controls. Micropositioning joystick assemblies move smoothly on the holding table to position the work piece which remains as positioned. The positioning operation involves simply sliding the joystick assemblies or chessmen micromanipulators in the direction of desired motion while observing through the microscope. The amount of motion in the microscope appears to match hand motion. In addition to the XY plane motion, Z plane motion is determined by moving a lever. The T.R.G. microwelder comprises the welding head laser, the optics including the microscope, a power supply with satisfactory interlock and the micromanipulators for positioning the work piece. It is provided with a ruby pump laser, two occulars and two objectives. The spot size has a standard diameter of 0.002 inch and can be adjusted from 0.001 to 0.250 inches. The energy range is 0–2 joules. Positioning accuracies of 10 to 15 millionths of an inch are obtained with the manipulation mechanism provided.

Figure 3:
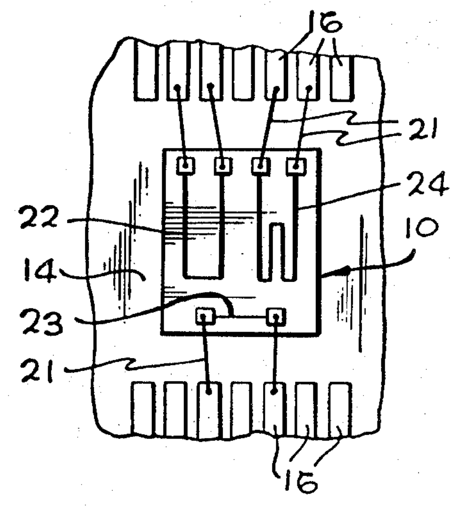
FIG. 3 is a plan view of the circuitry on the semiconductor chip in the package of FIG. 1.

The resistors 22, 23, and 24 shown in FIG. 3 are evaporatively deposited cermet thin film resistors. A "cermet" is a mixture of metal and insulator, a typical example being silicon monoxide (which is an insulator) and chromium (which is a conductor). In adjusting resistance values by a laser, the laser beam is focused on a portion of the deposited thin film resistor so as to heat it. It is believed that the heat applied anneals the chromium atoms so that they recrystalize or link up to form larger crystals, thereby increasing the conductivity of the resistor. In any event, it has been demonstrated that the application of energy from a laser beam will in fact increase the conductivity or decrease the resistivity in a measurable and controllable amount so that very precise final adjustment of resistance values can be made. Resistance values can be corrected by as much as plus or minus 50 percent on thin film cermet comprising as noted above a mixture of silicon monoxide and chromium formed by vacuum evaporation. On the other hand, by this technique, it is possible to control resistance of 10,000 ohms to plus or minus 1 ohm. Of course, although the figures are given for cermet resistors, it will be understood that the technique is applicable to many different types of resistors. In practice, the operator of the laser first makes electrical measurements to determine what the existing resistance characteristics are, and knowing what they should be, he then heats a predetermined area to correct the resistor's characteristics.

The laser can also be used to increase resistivity. This is done by simply evaporating a portion of the cermet material. The evaporation is conducted at a wattage output a few times greater than that required for annealing or recrystalizing. It is estimated that the production cost of adjusting resistor values by the methods disclosed herein comes to only a few cents each. Even under manual operation, this appears to be economically beneficial in production of microcircuits which frequently sell for hundreds of dollars. Furthermore, it appears likely that apparatus can be developed to automate the technique.

As noted above, once the value of the resistor has been adjusted, it may in certain applications be desirable to place a layer of paint or other opaque material on the transparent cover so as to prevent the circuit from receiving extraneous light or other radiation which may result in the generation of spurious photoelectric signals.

On the other hand, should it be desirable for the circuitry to receive a light signal, of course, one would not apply an opaquing material. That is to say, the circuitry in the package may be a flip-flop or other circuit to which it may be desired to apply a light input signal. Such could easily be achieved by providing the circuit with a photosensitive resistor which in normal circuit operation would convert the light signal to an appropriate electrical signal inside the package. Alternatively, even where normal operation does not contemplate a light signal input to the device, one may wish to remove opaquing paint or other materials which have been applied in order to check the state of operation of the circuit or to apply a light signal for signal tracing techniques used in repair or quality maintenance. If it is desired, to incorporate a circuit in the device which is permanently intended to operate in response to a light signal, it will, of course, be understood that the transparent cover could include a lens or other optical means to focus the light signal on a predetermined portion of the circuitry.

While a specific preferred embodiment of the invention has been described by way of illustration only, it will be understood that the invention is capable of many other specific embodiments and modifications and is defined solely by the following claims.

What is claimed is:

1. A method of packaging a microelectronic circuit device having thin-film resistors deposited on a surface thereof, comprising:

hermetically sealing said device within a container provided with an optically transparent window portion spaced from the thin-film resistors so that said thinfilm resistors are exposed through said window portion; and while said device is hermetically sealed, adjusting the electrical resistance of said thin-film resistors to predetermined values by exposing them to radiation transmitted through said window portion from a laser source positioned outside of said container.

2. A method of packaging a microelectronic circuit device having a subsurface and an opposing active surface, upon which active surface thin-film resistors are deposited, comprising:

mounting said device with its subsurface on the base portion of an open container;

hermetically closing said container with an optically transparent member spaced from the active surface of said device so as to leave said thin-film resistors optically exposed through said member to the exterior of said container; and irradiating said thin-film resistors with a laser beam directed through said transparent member from a source positioned exteriorly of said container to adjust the resistance of said thin-film resistors to predetermined values while said device is hermetically sealed.

3. A method of packaging a semiconductor chip having a lower mounting surface and an upper active surface, said upper active surface containing microcircuitry that includes thin-film resistors, said method comprising:

providing a flat pack including a base portion having an upper mounting surface and a peripheral upstanding lid portion encircling said base portion, said lid portion having a height greater than the thickness of said semiconductor chip;

mounting said semiconductor chip with its lower mounting surface down upon the upper mounting surface of said flat pack so that said lid portion extends above the upper active surface of said semiconductor chip;

sealing an optically transparent member across the upper extremity of said lid portion to hermetically enclose said semiconductor chip within said flat pack with the active surface of said semiconductor chip spaced from said transparent member so as to optically expose said thin-film resistors to the exterior of said sealed flat pack; and while said semiconductor chip is hermetically sealed irradiating said thin-film resistors with optical radiation transmitted through said optically transparent member from a laser source positioned outside said sealed flat pack to adjust the resistance of said thin-film resistors to predetermined values.

4. The invention according to claim 3, wherein said flat pack is made of a metal alloy, said transparent member is a thin plate of glass having a coefficient of thermal expansion matching that of said metal alloy, and said transparent member is sealed to said flat pack by a glass-to-metal seal.

5. The invention according to claim 4, wherein said thin-film resistors are made of a cermet composition.

6. The invention according to claim 5, wherein said thin-film resistors are made of a mixture of chromium and silicon monoxide.

7. A method of packaging a semiconductor chip having a lower mounting surface and an upper active surface, said upper active surface containing microcircuitry that includes thin-film resistors, said method comprising:

providing a flat pack including a base portion having an upper mounting surface and a peripheral upstanding lid portion encircling said base portion, said lid portion having a height greater than the thickness of said semiconductor chip;

mounting said semiconductor chip with its lower mounting surface down upon the upper mounting surface of said flat pack so that said lid portion extends above the upper active surface of said semiconductor chip;

sealing an optically transparent member across the upper extremity of said lid portion to hermetically enclose said semiconductor chip within said flat pack with the active surface of said semiconductor chip spaced from said transparent member so as to optically expose said thin-film resistors to the exterior of said sealed flat pack;

while said semiconductor chip is hermetically sealed irradiating said thin-film resistors with optical radiation transmitted through said optically transparent member from a laser source positioned outside said sealed flat pack to adjust the resistance of said thin-film resistors to predetermined values; and applying an opaque layer to the external surface of said transparent member after said thin-film resistors have been irradiated by said laser source.

8. A process of adjusting resistor values in a microelectronic circuit device comprising:

fabricating a microelectronic circuit device including a resistor;

mounting said device in an open packaging means;

hermetically sealing said packaging means with a member having optically transparent access means positioned to mechanically protect said device while permitting optical access thereto;

said member having a coefficient of thermal expansion matching that of said packaging means; and focusing optical radiation on a preselected resistor in said device hermetically sealed within said packaging means to adjust the resistance value thereof by transmitting said radiation through said optically transparent access means.

9. A process of adjusting resistor values in a microelectronic circuit device comprising:

fabricating a semiconductor microelectronic circuit device having a thin-film resistor deposited thereon;

mounting said device in an open generally flat packaging means;

hermetically sealing said packaging means with a member having optically transparent access means and coefficient of thermal expansion matching that of said packaging means; and focusing radiation from a laser on a preselected portion of said thin-film resistor in said hermetically sealed microelectronic circuit device to adjust the resistance value thereof by transmitting said radiation through said optically transparent access means to said thin-film resistor.

10. A process of adjusting resistor values in a microelectronic circuit device comprising:

fabricating a semiconductor microelectronic circuit device having a thin-film resistor deposited thereon;

mounting said device in an open generally flat packaging means;

hermetically sealing said packaging means with a member having optically transparent access means and coefficient of thermal expansion matching that of said packaging means;

focusing radiation from a laser on a preselected portion of said thin-film resistor in said hermetically sealed microelectronic circuit device to adjust the resistance value thereof by transmitting said radiation through said optically transparent access means to said thin-film resistor; and covering said optically transparent means with an opaque material after said resistance value is finally adjusted.

* * * * *